United States Patent
Poisner

(10) Patent No.: US 7,797,728 B2
(45) Date of Patent: Sep. 14, 2010

(54) MECHANISM TO GENERATE RESTRICTED AND UNRESTRICTED EXECUTION ENVIRONMENTS

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 970 days.

(21) Appl. No.: 10/974,217

(22) Filed: Oct. 27, 2004

(65) Prior Publication Data

US 2006/0101463 A1    May 11, 2006

(51) Int. Cl.
*H04L 9/32* (2006.01)
*G06F 7/04* (2006.01)
*H04L 9/00* (2006.01)

(52) U.S. Cl. ............... 726/2; 726/3; 726/4; 726/5; 726/6; 726/7; 713/182; 709/223; 709/224; 709/225

(58) Field of Classification Search ............... 726/2
See application file for complete search history.

(56) References Cited

U.S. PATENT DOCUMENTS

| | | | |
|---|---|---|---|
| 4,442,484 A * | 4/1984 | Childs et al. ............ 711/163 |
| 5,038,281 A | 8/1991 | Peters | |
| 5,822,435 A * | 10/1998 | Boebert et al. .......... 713/192 |
| 5,845,129 A * | 12/1998 | Wendorf et al. ......... 710/200 |
| 5,900,025 A | 5/1999 | Sollars | |
| 6,047,307 A * | 4/2000 | Radko ................... 718/100 |
| 6,192,395 B1 * | 2/2001 | Lerner et al. ........... 709/204 |
| 6,349,355 B1 | 2/2002 | Draves et al. | |
| 6,684,262 B1 | 1/2004 | Miller et al. | |
| 2002/0095565 A1 | 7/2002 | Nemirovsky et al. | |
| 2002/0124237 A1 | 9/2002 | Sprunt et al. | |
| 2003/0009648 A1 * | 1/2003 | Doing et al. ............ 711/202 |
| 2004/0073772 A1 | 4/2004 | Hokenek et al. | |
| 2004/0117670 A1 | 6/2004 | Kurts et al. | |

FOREIGN PATENT DOCUMENTS

| JP | 11-505652 A | 5/1999 |
|---|---|---|
| WO | 97/36235 A1 | 10/1997 |

OTHER PUBLICATIONS

"Office Action dated Feb. 7, 2008", for *German Patent Application No. 11 2005 002 314.1*, 5 pages.
PCT Search Report, PCT/US2005/039048, mailed Mar. 16, 2006.
Office Action received for German Patent Application No. 112005002314.1, mailed on Jun. 19, 2009, 5 pages.
Office Action received for GB patent Application No. 0706013.0, mailed on Oct. 26, 2007, 4 pages.
Office Action received for GB Patent Application No. 0706013.0, mailed on Jun. 9, 2008, 3 pages.

(Continued)

*Primary Examiner*—Longbit Chai
(74) *Attorney, Agent, or Firm*—Caven & Aghevli LLC

(57) ABSTRACT

According to one embodiment, computer system is disclosed. The computer system includes a central processing unit (CPU) having a first thread having first associated thread identification (ID) and a second thread having second associated thread ID. The computer system also includes a chipset coupled to receive access requests from the CPU and to examine a thread ID included with the access request to determine which thread is requesting access.

24 Claims, 3 Drawing Sheets

OTHER PUBLICATIONS

Office Action received for CN Patent Application No. 200580032988.9, mailed on Jul. 14, 2008, 18 pages inclusive of English translation.

Office Action received for CN Patent Application No. 200580032988.9, mailed on Dec. 15, 2008, 19 pages inclusive of English translation.

Office Action Received for CN Patent Application No. 200580032988.9, mailed on Jul. 1, 2009, 4 pages inclusive of English translation.

Office Action received for CN Patent Application No. 200580032988.9, mailed on Nov. 27, 2009, 6 pages inclusive of English translation.

Office action received for German Patent Application No. 11 2005 002 314.1, mailed on May 6, 2009, 3 pages inclusive of English Translation.

International Preliminary Report received for PCT Application No. PCT/US05/39048, mailed on May 10, 2007, 7 pages.

Invitation to Respond to Written Opinion Received for Singapore Patent Application No. 200702415-1, mailed on Jun. 26, 2008, 6 pages.

Office Action received for Japanese Patent Application No. 2007-539196, mailed on Apr. 20, 2010, 3 pages of Office Action and 3 pages of English Translation.

Office Action received for German Patent Application No. 11 2005 002 314.1, mailed on May 7, 2010, 2 pages of Office Action and 1 page of English Translation.

* cited by examiner

MECHANISM TO GENERATE RESTRICTED AND UNRESTRICTED EXECUTION ENVIRONMENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to computer systems that may operate in a trusted or secured environment.

There are a variety of applications that would benefit from "isolated execution" and "isolated storage". Isolated execution is the capability of running code that cannot be disrupted or observed by other software. Isolated execution is important for security software, as well as for protection from non-malicious but poorly written software. For example, a poorly written device driver can potentially interfere with the proper operation of an operating system (OS), resulting in a crash that prevents time-critical apps (such as a Digital Video Recorder) from operating.

Isolated storage relates to an ability to have data stored in non-volatile memory that can be accessed only by an authorized owner. Thus, no other software has the ability to modify or delete the data. The deletion concept is important since an error in an OS or its device driver could result in data on a disk becoming inaccessible.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
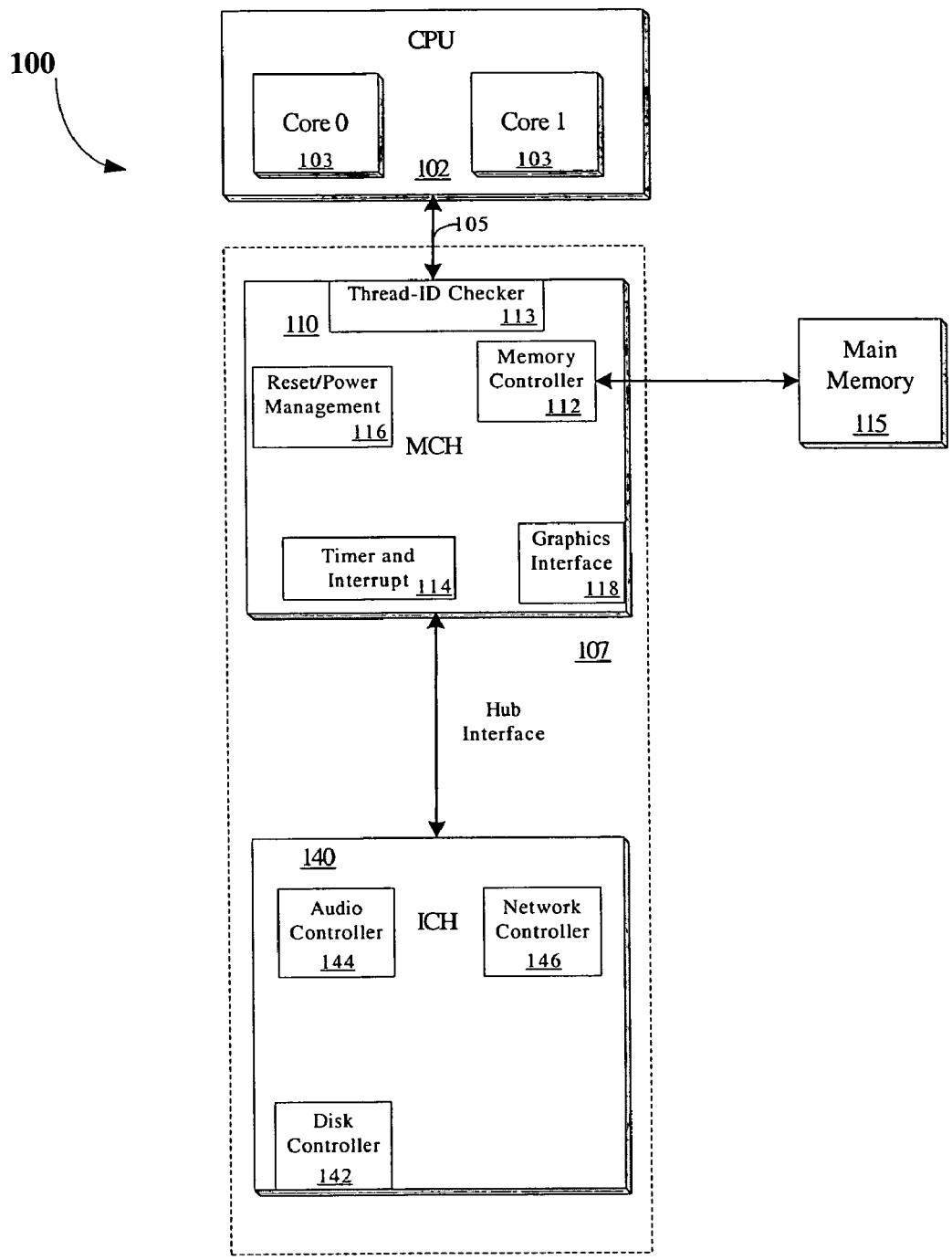
FIG. 1 is a block diagram of one embodiment of a computer system.

A mechanism for restricted and unrestricted execution environments in a computer system is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 is a block diagram of one embodiment of a computer system 100. Computer system 100 includes a central processing unit (CPU) 102 coupled to bus 105. According to one embodiment, CPU 102 includes multiple cores 103. For instance, CPU 102 includes core 0 and core 1. In one embodiment, computer system 100 simultaneously operates multiple operating systems. In such an embodiment, a separate OS operates on each core 103. Thus, a first OS operates on core 0, while a second OS operates on core 1. In a further embodiment, each individual core may run more than one thread. However, in the description below the term thread is used to indicate processor function implementing an OS.

In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types.

According to one embodiment, MCH 110 includes a thread-ID checker 113. ID checker 113 receives a thread-ID from CPU 102 via bus 105 indicating which thread is performing a memory or I/O access. In one embodiment, thread-ID checker 113 allocates specific memory regions to a specific thread.

In a further embodiment, an unrestricted thread is provided access to all pages of memory, while one or more other restricted threads are provided access only to specific pages. Further, CPU 102 and chipset 107 enable restricted components of computer system 100 platform to be modified while the unrestricted components of the platform are not reset. In yet a further embodiment, the unrestricted thread may have supervisory access over restricted threads. Such supervisory access enables the unrestricted thread to examine the access levels of the restricted threads.

MCH 110 also includes a timer and interrupt resources 114 and reset and power management registers 116. Timer and interrupt resources are provided to the unrestricted threads to allow the unrestricted thread the ability to have timer and interrupt services that cannot be modified (deliberately or accidentally) by the restricted thread(s).

Reset and power management registers 116 are also implemented for the unrestricted threads. Reset and power management registers 116 cause events that will be handled by the restricted threads. This allows the restricted threads to own the reset and power management policies. According to one embodiment, MCH 110 enables critical events that would normally cause a System Management Interrupt (SMI) to instead cause an interrupt to the unrestricted thread. This allows for OS-independent threads to be run on the unrestricted thread without disturbing the execution flow of the OS running on the restricted thread.

MCH 110 may also include a graphics interface 118. According to one embodiment, graphics interface 118 enables an unrestricted thread to display a window on a display monitor (not shown) so that a window associated with a restricted thread cannot be placed on top of the window associated with the unrestricted thread.

MCH 110 is coupled to an input/output control hub (ICH) 140 via a hub interface. ICH 140 provides an interface to input/output (I/O) devices within computer system 100. ICH 140 includes disk controller 142, audio controller 144 and network controller 146. Disk controller 142 interfaces with one or more disk drives (not shown) to control to control the transfer of data between chipset 107 and the drives.

Figure 2:
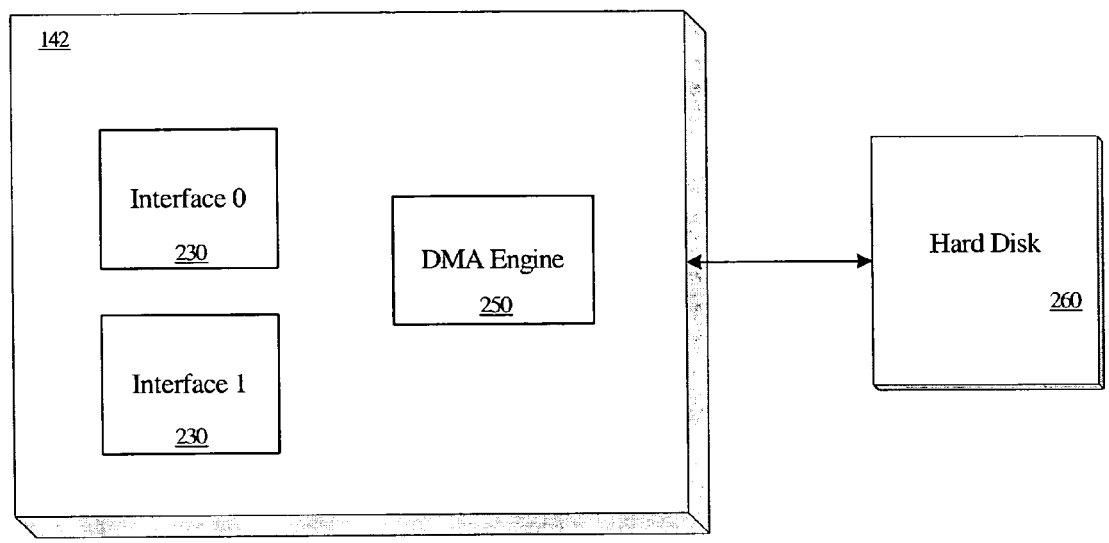
FIG. 2 is a block diagram illustrating one embodiment of a disk controller coupled to a disk.

According to one embodiment, the unrestricted thread is allowed full access to data on a hard disk 260 via the disk controller 142. However, in such an embodiment, restricted threads are not permitted to access specific sections of the disk 260. FIG. 2 is a block diagram illustrating one embodiment of a disk controller 142 coupled to a disk. Disk controller 142 includes interfaces 230 and direct memory access (DMA) engines 250. Interfaces 230 include interfaces 0 and 1.

Interface 0 and interface 1 present independent interfaces to software accessing data on hard disk 260. For example, one configuration space may be seen by the unrestricted thread, while the other is seen by one or more unrestricted threads. DMA engines 250 facilitate direct memory accesses between hard disk 260 and other memory devices (e.g. memory 115) at computer system 100.

Referring back to FIG. 1, audio controller 144 operates to coordinate the recording and playing of sounds. According to one embodiment, audio controller 144 allows an output audio stream to operate independently for the unrestricted and restricted threads. This prevents the restricted thread from "muting" the unrestricted thread. In a further embodiment, audio controller 144 includes a mode to allow an input stream to be transmitted first to the unrestricted thread, which can decide if the audio data should be passed to the restricted thread.

Network controller 146 links computer system 100 to a network of computers (not shown in FIG. 1) and supports communication among the machines. According to one embodiment, the unrestricted thread is allowed full access to network controller 146, while the restricted threads will not have full access. In one embodiment, packets that are "transmitted" by the restricted threads are first made available for inspection or modification by the unrestricted thread. Further, packets received from the network can first be inspected by the unrestricted thread before being made available to the restricted thread.

Figure 3:
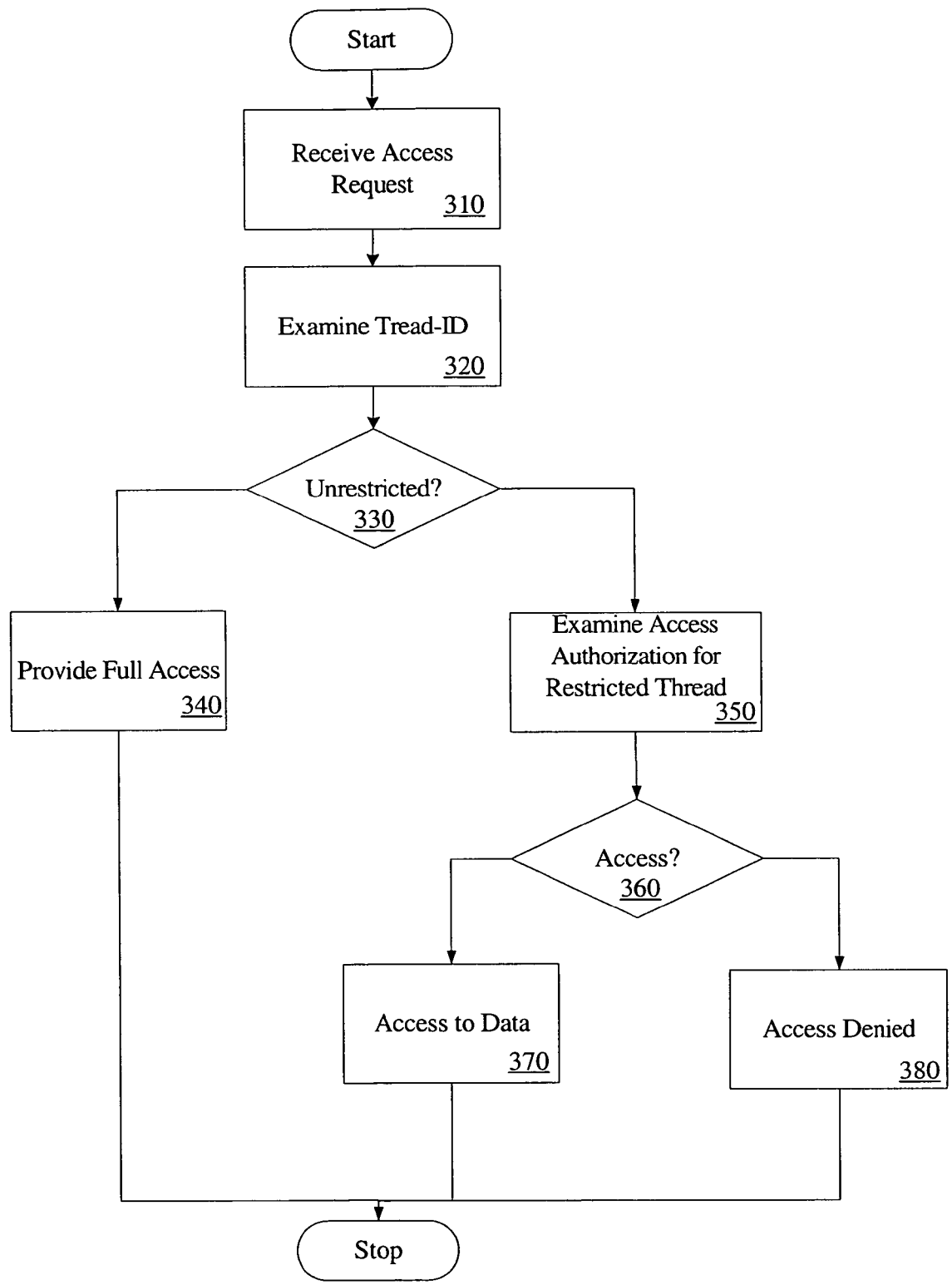
FIG. 3 is a flow diagram of one embodiment for the operation of a computer system.

FIG. 3 is a flow diagram of one embodiment for memory or I/O access request at computer system 100. At processing block 310, a request to access a device is received at chipset 107 from CPU 102. For example, such a request may be received at MCH 110 to access memory 115. Similarly, the request may be received at disk controller 142 for access to hard disk 260.

At processing block 320, thread-ID checker 113 examines the thread-ID included with the request to determine the requesting thread. At decision block 330, it is determined whether the requesting thread is a restricted thread or an unrestricted thread. If an unrestricted thread, the unrestricted thread is provided full access to data from the device for which the request is targeted, processing block 340.

However if a restricted thread, an examination occurs to determine whether the restricted thread has access to the requested resources, processing block 350. At decision block 360, it is determined whether the restricted thread may access the requested data. If access is specified, the thread is provided access to the requested data from the device for which the request is targeted, processing block 370. However, if it is determined that the thread does not have access to the requested data, access is denied, processing block 380.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer system comprising:
   a central processing unit (CPU) having:
   a first thread having first associated thread identification (ID); and
   a second thread having second associated thread ID; and
   a chipset coupled to receive access requests, from the CPU, to access requested resources, the chipset to examine a thread ID included with each of the access requests to determine which thread is requesting access to the requested resources,
   wherein the first thread is an unrestricted thread that is provided full access to data and the second thread is a restricted thread that is provided limited access to data, wherein at least one of the first or second threads is to provide a respective processor function to implement an operating system, wherein the chipset is to operate in a plurality of modes comprising: said each of the access requests to be first transferred to the unrestricted thread to determine whether a request is to be passed to the restricted thread or the first thread and the second thread to operate independently to prevent the restricted thread from muting the unrestricted thread; and
   a thread checker to examine the thread ID and determine whether the corresponding thread is to access the requested resources.

2. The computer system of claim 1 further comprising a memory device coupled to the chipset, wherein the unrestricted thread is provided access to all pages of the memory device and the restricted thread is provided access to allocated regions of the memory device.

3. The computer system of claim 1 wherein the CPU and the chipset enable restricted components of computer system to be modified, and the unrestricted components to remain unmodified.

4. The computer system of claim 1 wherein the unrestricted thread has supervisory access over the restricted thread to enable the unrestricted thread to examine access levels of the restricted thread.

5. The computer system of claim 1 wherein the chipset comprises timer and interrupt resources that cannot be modified by the restricted thread.

6. The computer system of claim 1 wherein the chipset further comprises registers to enable the unrestricted thread to cause events that will be handled by the restricted threads.

7. The computer system of claim 1 wherein the chipset comprises a graphics interface to enable the unrestricted thread to display a window on a monitor so that a window associated with the restricted thread cannot be placed on top of the window associated with the unrestricted thread.

8. The computer system of claim 1 wherein the chipset comprises a disk controller to provide the unrestricted thread full access to data on a hard disk coupled to the disk controller and to provide the restricted threads access to specific sections of the hard disk.

9. The computer system of claim 8 wherein the disk controller comprises:
   a first interface associated with the unrestricted thread;
   a second interface associated with the restricted thread; and
   a DMA engine.

10. The computer system of claim 1 wherein the chipset comprises an audio controller to allow an output audio stream to operate independently for the unrestricted and restricted threads to prevent the restricted thread from muting the unrestricted thread.

11. The computer system of claim 10 wherein the audio controller includes a mode to allow an input stream to be transmitted to the unrestricted thread first to determine if the audio data should be passed to the restricted thread.

12. The computer system of claim 1 wherein the chipset comprises a network controller to allow the unrestricted thread full access and the restricted thread restricted access.

13. The computer system of claim 12 wherein packets that are transmitted by the restricted threads are made available for inspection or modification by the unrestricted thread and, packets received from the network are first inspected by the unrestricted thread before being made available to the restricted thread.

14. A method comprising:
   configuring at least one processor device to perform the functions of:
   receiving a request to access one or more requested resources;
   examining, at a chipset, a thread identification (ID) associated with the request to determine whether a corresponding thread is to access the requested resources,
   wherein a first thread is an unrestricted thread that is provided full access to data and a second thread is a restricted thread that is provided limited access to data, wherein at least one of the first or second threads is to provide a respective processor function to implement an operating system, wherein the chipset is to operate in a plurality of modes comprising: the access request to be first transferred to the unrestricted thread to determine whether a request is to be passed to the restricted thread or the first thread and the second thread to operate independently to prevent the restricted thread from muting the unrestricted thread; and
   examining, at a thread checker, the thread ID and determining whether the corresponding thread is to access the requested resources.

15. The method of claim 14 further comprising providing access to predetermined components of the resources if the thread ID indicates a request from a restricted thread.

16. An article of manufacture including one or more non-transitory computer readable storage media that embody a program of instructions, wherein the program of instructions, when executed by a processing unit, causes the processing unit to:
   receive a request to access one or more requested resources;
   examine, by a chipset, a thread identification (ID) associated with the request to determine whether a corresponding thread is to access the requested resources;
   wherein a first thread is an unrestricted thread that is provided full access to data and a second thread is a restricted thread that is provided limited access to data, wherein at least one of the first or second threads is to provide a respective processor function to implement an operating system, wherein the chipset is to operate in a plurality of modes comprising: the access request to be first transferred to the unrestricted thread to determine whether the request is to be passed to the restricted thread or the first thread and the second thread to operate independently to prevent the restricted thread from muting the unrestricted thread; and
   examine, at a thread checker, the thread ID and determine whether the corresponding thread is to access the requested resources.

17. A chipset comprising:
   at least one processor device or circuitry;

a thread identification (ID) checker to examine thread IDs included with an access request received from a central processing unit (CPU), to access requested resources, the thread ID checker to determine if the access request originated at a first thread having first associated thread identification (ID) or a second thread having second associated thread ID, wherein the first thread is an unrestricted thread that is provided full access to data and the second thread is a restricted thread that is provided limited access to data; and wherein at least one of the first or second threads is to provide a respective processor function to implement an operating system, wherein the chipset is to operate in a plurality of modes comprising: the access request to be first transferred to the unrestricted thread to determine whether a request is to be passed to the restricted thread or the first thread and the second thread to operate independently to prevent the restricted thread from muting the unrestricted thread; and wherein the thread ID checker is to examine the thread ID and determine whether a corresponding thread is to access the requested resources.

18. The chipset of claim 17 wherein the chipset comprises timer and interrupt resources that cannot be modified by the restricted thread.

19. The chipset of claim 18 wherein the chipset further comprises registers to enable the unrestricted thread to cause events that will be handled by the restricted threads.

20. The chipset of claim 17 wherein the chipset comprises a graphics interface to enable the unrestricted thread to display a window on a monitor so that a window associated with the restricted thread cannot be placed on top of the window associated with the unrestricted thread.

21. The chipset of claim 17 wherein the chipset comprises a disk controller to provide the unrestricted thread full access to data on a hard disk coupled to the disk controller and to provide the restricted threads access to specific sections of the hard disk.

22. The chipset of claim 17 wherein the chipset comprises an audio controller to allow an output audio stream to operate independently for the unrestricted and restricted threads to prevent the restricted thread from muting the unrestricted thread.

23. The chipset of claim 17 wherein the chipset comprises a network controller to allow the unrestricted thread full access and the restricted thread restricted access.

24. The chipset of claim 17 wherein the unrestricted thread has supervisory access over the restricted thread to enable the unrestricted thread to examine the access levels of the restricted thread.

* * * * *